May 19, 1953
P. M. HALL
2,638,817
TOOL TRIMMING DEVICE
Filed Jan. 14, 1948
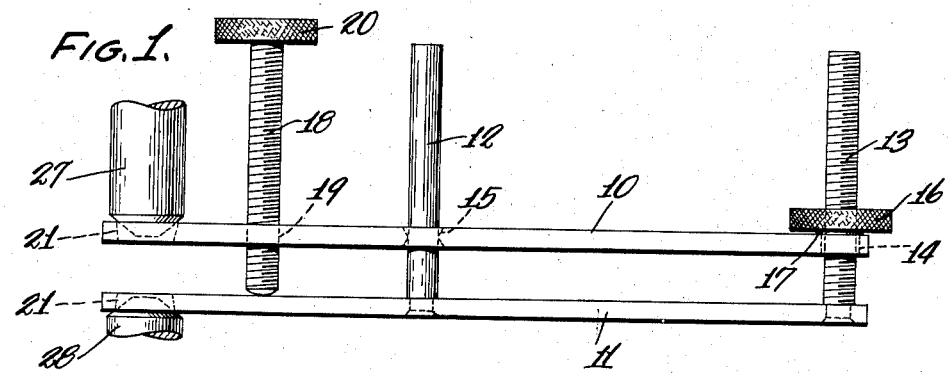
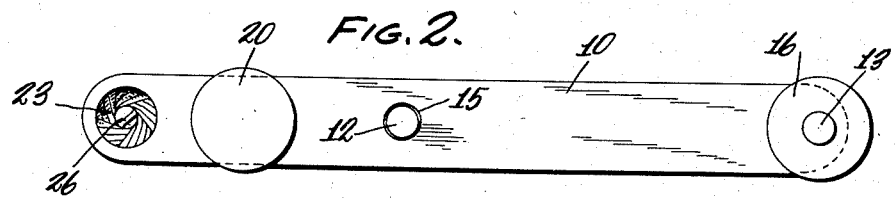
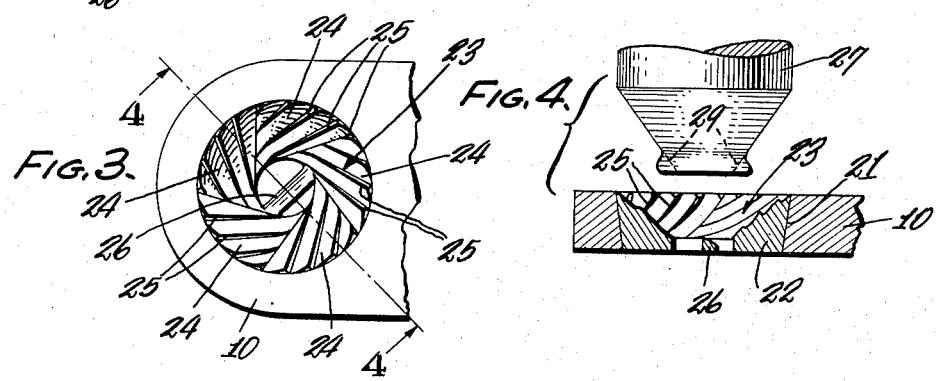
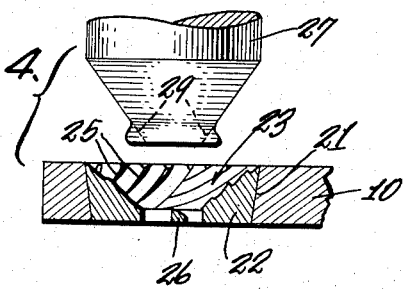
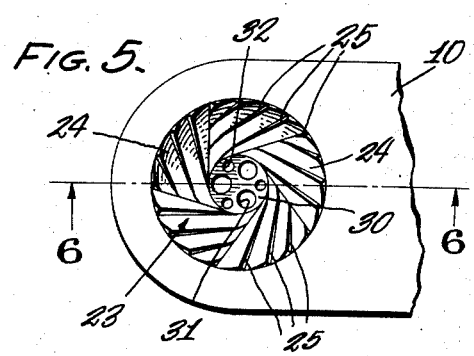
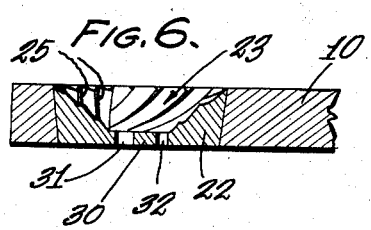
INVENTOR.
PRESTON M. HALL
BY
Michael Williams
ATTORNEY Patented May 19, 1953

2,638,817

UNITED STATES PATENT OFFICE 2,638,817

TOOL TRIMMING DEVICE

Preston M. Hall, Warren, Ohio

Application January 14, 1948, Serial No. 2,309

6 Claims. (Cl. 90—12)

My invention relates to tool trimming devices, particularly to devices for trimming the electrodes of an electric resistance welding machine, and the principal object of my invention is to provide new and improved devices of this character.

Tool life and care is of great importance to modern production, and designers customarily plan machine production in accordance with tools of predetermined characteristics. Perhaps the electric resistance welding industry provides the best example of the high degree of care required of tools to meet a required production quota. For example, spot welding electrodes are so designed as to operate most efficiently under a given set of conditions, and in such case, the contour of the electrode is of great importance. Hence, it will be apparent that in order to operate at designed efficiency, care must be exercised that the contour of the electrodes be maintained within relatively close limits.

The electrodes used in spot welding machines are usually formed from copper or copper alloy, and because of the pressure used in welding, and the heat resulting from welding, the extremity of the electrode has a tendency to "mushroom," that is, to widen at its tip.

Since such factors as welding current, pressure, and current duration are largely correlated with current density at the weld region, it will be clear that these characteristics, which are ordinarily fixed for a particular welding operation, would be improper if the current density at the weld were changed.

Current density at the weld is determined by the area of electrode surface in contact with the surface of the metals to be welded. Thus, as the electrode "mushrooms," current density will be decreased, resulting in wider spread heat distribution and improper welds.

The ordinary methods available to maintain tip size were not sufficiently flexible or expeditious to appeal to the industry, with a result that either manufacturing costs were increased, or weldments were impaired.

An early method of trimming electrodes was to dress such tips with a file. This of course was inaccurate, and was not used in quality shops. Another method was to remove the electrodes, and dress them in a lathe. This, although being more accurate, proved too costly. As a result, certain dressing tools were devised for the purpose of trimming the electrodes in situ, but none has proved flexible enough to meet industrial requirements.

For example, certain spot welding machines are designed to run through a complete welding cycle, so that when the machine is stopped, the electrodes are separated a substantial distance, making it difficult to trim both electrodes simultaneously with a single trimming device. In other machines, the electrode separation is so slight that it was impossible to insert a trimming device therebetween to trim both electrodes simultaneously.

Other disadvantages of the prior art resulted from the fact that the available trimming devices would trim only one type of electrode, requiring a different device for each type of electrode. My invention provides a trimming device which is flexible to meet the foregoing and other requirements of the industry, is easy and economical to use, and produces accurate results.

In the drawing accompanying this specification and forming a part of this application, there is shown, for purposes of illustration, embodiments which my invention may assume, and in this drawing:

Figure 1 is side elevational view of a device embodying my invention, the tools to be trimmed, such as spot welding electrodes, being fragmentarily shown, Figure 2 is a plan view of the device, Figure 3 is an enlarged fragmentary plan view of one form of trimming means which may be used, Figure 4 is a fragmentary sectional view corresponding generally to the line 4—4 of Figure 3, a fragmentarily shown welding electrode being illustrated in position prior to trimming operation, Figure 5 is an enlarged fragmentary plan view of another form of trimming means which may be used, and Figure 6 is a fragmentary sectional view corresponding generally to the line 6—6 of Figure 5.

Generally, my invention comprises body means having a recess for receiving that portion of the tool which is to be trimmed, the recess being contoured to correspond to the desired contour of the tool portion, and the defining wall of the recess being formed with means for removing material from the tool portion.

The body means referred to is preferably in the form of a tapered plug which securely fits within a correspondingly tapered recess in a respective carrier portion, but which may readily be removed therefrom. Means are provided for urging the body means to pressure contact with a respective tool portion.

Referring particularly to Figures 1 through 4 of the drawing, the embodiment therein shown to disclose the invention comprises a pair of bar members 10 and 11 in juxtaposed relation. The member 11 carries a laterally extending pivot post 12, positioned intermediate its ends, and a laterally extending screw-threaded post 13 adjacent to one of its ends.

The bar member 10 has an aperture 14 freely passing the screw-threaded post 13, and an aperture 15 for passing the pivot post 12. Referring particularly to Figure 1, it will be noted that the aperture 15 is so formed that its defining surface intermediate its ends closely fits the post 12, whereas the aperture 15 is widened at each of its ends, so as to facilitate rocking of the bar member 10 laterally with respect to the bar member 11.

A wheel 16 is threaded on the post 13, and has a boss 17 adapted to have reduced area contact with the adjoining surface of the bar member 10, to reduce frictional opposition to the turning of the wheel 16.

On the other side of the pivot post 12, a screw threaded rod 18 is threaded through an aperture 19 formed in the bar member 10, the inner end of the rod 18 being adapted to bear against a surface of the bar member 11. The rod 18 may have a headed portion 20 to facilitate rotation thereof.

Each of the bar members 10 and 11, at the end near the screw rod 18, is formed with a tapered recess or aperture 21, the members being so disposed that the recesses 21 taper in opposite directions. Thus, in the disposition of the parts as shown in Figure 1, each of the recesses 21 tapers inwardly to a smaller size.

The body means before referred to comprises a plug 22 which is tapered correspondingly to the taper of a respective recess 21, so that a plug 22 may be inserted within its respective recess and firmly secured therein, yet may readily be removed therefrom, as by application of slight pressure or by tapping with a suitable tool. Any suitable amount of taper may be used for the purpose, example being the taper commonly used on drill and cutting tool shanks.

The plug 22 is provided with a recess 23 for receiving that portion of the tool to be trimmed. In the embodiment shown in Figures 1 through 4, the recess 23 tapers inwardly to a smaller size and is contoured to correspond to the desired contour of the tool portion.

The defining wall of the recess 23 is provided with means for removing material from the tool portion, and as here shown, this defining wall is formed with a series of cutting means 24 extending inwardly from the larger mouth of the recess. Each cutting means comprises a series of cutting edges 25 disposed at an angle to the recess axis, and provided with suitable rake to insure clearance for the material removed from the tool portion. As best seen in Figures 3 and 4, a transversely positioned cutting edge 26, also provided with rake, is disposed inwardly of the recess 23, preferably at its smallest area.

In cases where the spaced tool portions, such as the electrodes 27 and 28 are identical, the plugs 22 in each of the bar members 10 and 11 may be identical. However, it will be appreciated that if the electrodes are dissimilar, correspondingly formed plugs 22 will be used. Figure 4 shows the electrode 27 formed with a "mushroomed" end resulting from use, the dotted lines 29 indicating the contour of the electrode 27 prior to use.

In operation, the screw rod 18 is rotated so that the bar members are brought together sufficiently to permit insertion of the plugs 22 between the electrodes 27, 28, and this rod is then reversely turned to cause the electrode portions to enter and seat within respective recesses 23.

The wheel 16 may then be turned to bear against the bar member 10 so as to urge the plugs 22 to bear against the electrodes 27, 28 with desired pressure. The members 10, 11 are then rotated in a plane generally transverse to the axis of the electrodes, whereby the cutting edges 25 remove the "mushroomed" material, and return the electrodes to original contour. The rod 18 and wheel 16, or either one, may be turned during the trimming operation, to insure good dressing contact between the plugs 22 and respective electrodes.

After the trimming operation, it is merely necessary to back off the rod 18, to provide for clearance to remove the trimming device. In addition to trimming, it will be appreciated that my trimming device may also be used to remove material which is picked up by the electrode from the work being welded, thus insuring a true and clean contact between the work and the electrodes.

If the contour of the electrode is changed, it is merely necessary to remove the plug 22, and insert a plug having a recess of proper contour. Thus my invention is flexible enough to accommodate electrodes ranging from cylindrical to any angular or curved contour. In cases where there is minimum clearance between electrodes, the screw rod 18 may be backed off so that the bar members 10 and 11 engage to permit insertion of the plugs 22 between electrodes.

The embodiment shown in Figures 5 and 6 is similar to that hereinbefore described, and similar reference members for like parts will be used. In this instance, the cutter edge 26 is omitted, the recess 23 tapering inwardly to a bottom wall 30. The wall 30 is formed with opening means for cutting effects, here shown as a series of apertures 31 and a series of smaller apertures 32. The upper edges of the surfaces defining these recesses, referring to the disposition of parts in Figure 6, provide cutting edges for dressing the extremity of the tool.

From the foregoing, it will be apparent to those skilled in the art that I have accomplished at least the principal object of my invention, and it also will be apparent to those skilled in the art that the embodiments herein described may be variously changed and modified, without departing from the spirit of the invention; and that the invention is capable of uses and has advantages not herein specifically described; hence it will be appreciated that the herein disclosed embodiment is illustrative only, and that my invention is not limited thereto.

I claim:

1. A device for trimming spaced tools, such as the electrodes of an electric resistance welder, comprising: a pair of bar members in juxtaposition, said members at one end having circular recesses tapering inwardly toward each other from their outwardly directed surfaces; a pair of plug means complementarily tapered to securely fit within respective recesses, yet being readily removable therefrom, each of said plug means having a recess extending inwardly from its outwardly directed surface, and being adapted to receive that portion of the respective tool which is to be trimmed; each of said plug means recesses being contoured to correspond to the desired contour of its respective tool portion, the defining wall surface of each plug means recess being formed with cutter edges for removing material from the tool portion; one of said bar members being pivotally carried by a pivot post carried by the other of said members; and screw means, on opposite sides of the pivot, for urging said plug means into pressure contact with respective tool portions.

2. A tool trimmer, comprising: body means providing a cone-like recess, the tapered wall of said recess being formed to provide a plurality of cutting edges arranged in groups, each group being disposed in skewed relation with the axis of said recess and with respect to an adjoining group; and one or more cutting edges disposed inwardly of said recess and extending transversely thereacross.

3. A tool trimmer, comprising: body means providing a cone-like recess, the tapered wall of said recess being formed to provide a plurality of cutting edges arranged in groups, each group being disposed in skewed relation with the axis of said recess and with respect to an adjoining group; and means disposed inwardly of said recess and extending transversely thereacross and providing one or more cutting edges, said means being apertured to allow passage of chips therethrough.

4. A device for trimming spaced tools, such as electrodes of a spot welder, comprising a pair of juxtaposed elongated members each having an outwardly tapering recess in its outwardly directed surface, tapered plug means securely fitting within respective recesses, each of said plug means having tool trimming means, and manually operable means for spreading apart said members and thus urging said plug means into tool trimming engagement with respective tools, said manually operable means comprising adjustment means for altering angular disposition of said plug means relative to respective tools, and said members providing a hand grip for manually rotating said device about said tools.

5. A device for trimming spaced tools, such as the electrodes of a spot welder, comprising a pair of juxtaposed elongated members, each having an outwardly tapering recess in its outer surface, tapered plug means securely fitting within respective recesses and each having a recess adapted to receive that portion of the tool to be trimmed, the recess of each plug means being contoured to correspond to the desired contour of the respective tool portion and the defining wall surface of each plug means recess including cutting edges for removing material from the respective tool portions, manually operable means for spreading apart said members so that said plug means recesses receive respective tools and said cutting edges are pressed thereagainst, said manually operable means comprising adjustment means for altering angular dispostion of said plug means relative to respective tools, and said members providing a hand grip for manually relating said device about said tools.

6. A tool trimmer comprising body means having an opening extending therethrough and tapering from a larger diameter at one side to a smaller diameter at the opposite side, the tapered wall defining said opening being formed to provide cutting edges arranged in groups, each group being disposed in skewed relation with the axis of said opening and with respect to an adjoining group, and cutting edge means extending across the smaller diameter of said opening and providing for passage of chips therethrough.

PRESTON M. HALL.

References Cited in the file of this patent

UNITED STATES PATENTS

| Number | Name | Date |
| --- | --- | --- |
| 1,298,934 | Hale | Apr. 1, 1919 |
| 1,558,825 | Beard | Oct. 27, 1925 |
| 1,590,201 | McGuckin | June 29, 1926 |
| 2,284,483 | Whitesell | May 26, 1942 |
| 2,286,931 | Radeke | June 16, 1942 |
| 2,292,581 | Richardson | Aug. 11, 1942 |
| 2,300,173 | Platz | Oct. 27, 1942 |
| 2,418,767 | Hall | Apr. 8, 1947 |
| 2,557,751 | Melzer | June 19, 1951 |

FOREIGN PATENTS

| Number | Country | Date |
| --- | --- | --- |
| 127,574 | Germany | Jan. 29, 1902 |
| 154,242 | Germany | Sept. 10, 1904 |
| 244,382 | Great Britain | Dec. 17, 1925 |